United States Patent
Kobylarz (10) Patent No.: US 7,424,292 B2
(45) Date of Patent: Sep. 9, 2008

(54) COMPOUND WIRELESS MOBILE COMMUNICATION SERVICES

(76) Inventor: Thaddeus John Kobylarz, 30 Altamont Ct., Morristown, NJ (US) 07960

(*) Notice: Subject to any disclaimer, the term of this patent is extended or adjusted under 35 U.S.C. 154(b) by 589 days.

(21) Appl. No.: 10/798,627

(22) Filed: Mar. 11, 2004

(65) Prior Publication Data
US 2005/0215247 A1   Sep. 29, 2005

(51) Int. Cl.
*H04Q 7/20* (2006.01)
(52) U.S. Cl. .................. 455/425; 455/305; 455/418; 455/424; 455/425; 455/426.1
(58) Field of Classification Search ............. 455/305, 455/418, 424, 425, 426.1
See application file for complete search history.

(56) References Cited
U.S. PATENT DOCUMENTS

| | | | | |
|---|---|---|---|---|
| 4,829,554 A * | 5/1989 | Barnes et al. | ............ | 455/432.1 |
| 5,715,516 A * | 2/1998 | Howard et al. | ............ | 455/422.1 |
| 5,802,469 A * | 9/1998 | Nounin et al. | ............ | 455/422.1 |
| 6,219,628 B1 * | 4/2001 | Kodosky et al. | ............... | 703/2 |
| 6,240,285 B1 * | 5/2001 | Blum et al. | ............... | 455/404.1 |
| 6,377,210 B1 * | 4/2002 | Moore | ................... | 342/357.13 |
| 2003/0018714 A1 * | 1/2003 | Mikhailov et al. | ......... | 709/203 |
| 2003/0035004 A1 * | 2/2003 | Dove et al. | ................... | 345/762 |
| 2004/0116140 A1 * | 6/2004 | Babbar et al. | ............... | 455/517 |
| 2004/0150667 A1 * | 8/2004 | Dove et al. | ................... | 345/763 |
| 2004/0198386 A1 * | 10/2004 | Dupray | .................... | 455/456.1 |

* cited by examiner

*Primary Examiner*—Nay Maung
*Assistant Examiner*—Janelle N. Young (57) ABSTRACT

Described are the concept, processes, and methods to combine an assortment of individually available and executable wireless mobile communication services for the purpose of achieving a desired objective(s). The activity of combining these individual services can be performed by a wireless communication user/subscriber, or a wireless communication service provider, or a wireless communication equipment supplier, or a wireless communication equipment manufacturer, etc. Once combined, these individual services represent an executable sequence that can be appropriately stored in a memory for future invocations by a user/subscriber. That is, a single invocation of the built service combination will execute the sequence of services whenever desired by a user/subscriber.

7 Claims, 8 Drawing Sheets

COMPOUND WIRELESS MOBILE COMMUNICATION SERVICES

CROSS-REFERENCE TO RELATED APPLICATIONS

Not Applicable.

FEDERALLY SPONSORED RESEARCH OR DEVELOPMENT

Not Applicable.

REFERENCE TO SEQUENCE LISTING, A TABLE, OR A COMPUTER LISTING

Not Applicable.

BACKGROUND OF THE INVENTION

This invention relates to wireless mobile communication systems. More particularly, this invention relates to processes and methods that permit the activity of combining wireless mobile communication services for the purpose of building more complex and useful wireless mobile communication services.

Wireless mobile communication service providers identify a set of mobile communication services available to a user and/or subscriber ("user/subscriber"). Besides communications of voice, other examples of such mobile communication services are transmission of pictures, retrieval of voice mails, transmission of instant messages, and the determination a user/subscriber's geographical location.

The currently available wireless mobile communication services cannot be partitioned into separately identifiable component wireless mobile communication services, wherein a component wireless mobile communication service may be separately invoked and thereby individually executed by a user/subscriber. That is, a user/subscriber must invoke the execution of the entire wireless mobile communication service and cannot invoke the execution a part of it as a separate service.

Such non-separable wireless mobile communication services are termed herein as "fundamental wireless mobile communication services". That is, a fundamental wireless mobile communication service is one that cannot be partitioned into separately identifiable component wireless mobile communication services, wherein the component wireless mobile communication services may also be separately invoked and thereby individually executed by a subscriber/user.

Additionally, a user/subscriber does not have the capability of combining wireless mobile communication services to establish a sequence of wireless mobile communication services that accomplish some specific and tractable goal. That is, a user/subscriber cannot request that a wireless mobile communication service provider execute a specified sequence of wireless mobile communication services automatically following a single invocation.

SUMMARY OF THE INVENTION

This invention defines the concept of combining wireless mobile communication services to build more complex wireless mobile communication services and identifies the concept's processes and methods to build these more complex wireless mobile communication services. For convenience, these more complex wireless mobile communication services are herein termed "compound wireless mobile communication services". That is, a compound wireless mobile communication service is a combination of fundamental wireless mobile communication services and other services represented in an executable sequence that is appropriately stored in a memory for future invocations by a subscriber/user.

It is envisaged that one or a combination of the following will build compound wireless mobile communication services:
1. A wireless mobile communication service provider,
2. A wireless mobile communication subscriber/user,
3. A wireless mobile communication equipment supplier/manufacturer,
4. A computer software supplier/manufacturer,
5. A third party applications/service provider.

An example is given to further summarize, but not limit, the invention. Consider having a severe time constraint for driving a vehicle between two geographic points. This may apply to commuting between one's home and a place of employment, or for a limousine driver to arrive at an airport in time for a passenger's flight, or for a chartered bus to reach its tour destination in a timely manner, etc. Three fundamental wireless mobile communication services can be employed to achieve this vehicular route assistance:
1. Location service—to determine the present location of a subscriber/user's wireless terminal in the vehicle.
2. Travel route computation—to compute the least time consuming drive between the current wireless terminal location and a designated destination (e.g., airport).
3. Traffic information retrieval—to interrogate traffic information systems available from state police and other sources for the regions of the travel route.

The compound wireless mobile communication service consists of continual iterations of these three component services until the destination is reached. The iteration sequence can consist of the following steps:
1. Determine the present location (service 1.) and provide it to the wireless terminal. If the present location is the same as the destination, thusly inform the subscriber/user and cease the iteration of these three component services.
2. Compute the least time consuming route from the present location to the designated destination (service 2.). If the route has changed, thusly alert the subscriber/user (orally/graphically/textually) of a new route and its directions.
3. Retrieve traffic information for the route's regions (service 3.) and determine if traffic delays (e.g., due to an accident) would ensue. If traffic delays exist ahead, repeat step 2 with the updated delay information. If no traffic delays exist ahead, go to step 1.

It is envisaged that both graphical displays and voice communication will transpire during the execution of this example and other compound wireless mobile communication services. For instance, if a traffic delay ahead results in a route change, there will be an audio annunciation and a graphical symbol displayed to the user/subscriber that a route change exists for unimpeded travel.

Implied by the above sequence are additional services that are not necessarily wireless mobile communication services. An example is the determination that the present location is the destination (equality determination). Another example is one that makes the decision between doing step 2 or doing step 1 (event conditioned execution). Services, such as the two preceding examples, are termed herein "facility services". Because a compound wireless mobile communication service consists of more than fundamental wireless mobile communication services, a service within a compound wireless mobile communication service is herein termed a "component service". A component service may be a fundamental wireless mobile communication service, a facility service, or another compound wireless mobile communication service.

Associated with most component services are parameters. Some parameters are constants throughout the execution of a compound wireless mobile communication service. Other parameters are variables whose values may change during the execution of a compound wireless mobile communication service. The builder of a compound wireless mobile communication service has the option to determine if a parameter is constant or variable.

Mobile communication service parameters and their values will be herein italicized. The outcomes of component services can be parameters and therefore component service outcomes (dependent variables) are also italicized. A specific value (i.e.; a constant understood by the executing software) is straddled within "quotation marks". Finally, functional expressions are sometimes used to identify a component service. The expression will contain a name, its parameters; and its constants. The functional expression's name is in bold type. The following functional expressions apply, but not limited, to the previous vehicular route assistance example:

Location service—Determines a geographical location of a wireless terminal.
  Location=Loc (WirelessTerminal#, Password)
    Where: WirelessTerminal# identifies the wireless terminal to be geographically located,
      Password establishes permission to execute this mobile communication service.
Routing service—Determines a road route for driving between two points.
  Route=Rte (Constraints, Location, Destination)
    Where: Constraints identifies route restrictions (e.g.; roads to avoid, fastest versus scenic route),
      Location is the geographical origin of the route,
      Destination is the geographical end of a route.
Region bounding service—Determines a permitted driving region containing the route.
  Region=Rgn (Route, Distance)
    Where: Route is the road route for driving between two points,
      Distance represents maximum additional driving distance.
Traffic service—Determines traffic locations that may cause delays within a region.
  Traffic=Trf (Region)
    Where: Region is the permitted driving region containing the route.
Delays service—Determines delays ahead of a location that exist in a route and a region.
  Delays=Dly (Route, Region, Location)
    Where: Route is the road route determined for driving between two points,
      Region is the permitted driving region containing the route,
      Location is the current wireless terminal geographical location.
Route constraints service—Used to determine those roads to avoid/use in a region.
  Constraints=Cns (Region, Criteria, Location)
    Where: Region is the permitted driving region containing the route,
      Criteria guide the constraint decisions (e.g.; traffic delays, fastest route),
      Location is the current wireless terminal geographical location.

Some parameters may require initial values (initialized parameters) to execute a compound wireless mobile communication service. Initialized parameters may also be constant or variable. The WirelessTerminal# and the Destination are two initialized parameters that remain constant in the above example. The Constraints parameter is initialized and a variable. (Constraints can assume an initial value of "none" or a long list.)

This invention represents the concept, processes, and methods to build and store compound wireless mobile communication service sequences that may be used and reused upon invocations.

DETAILED DESCRIPTION OF THE INVENTION

This invention views all component services as software subroutine calls. That is, the component services are considered to be parts of software programs. Hence, both fundamental wireless mobile communication services, compound wireless mobile communication services, and facility services can be parts of a larger program to execute more complicated wireless services. This viewpoint establishes a limitless repertoire of compound wireless mobile communication services to a user/subscriber. A limitless repertoire exists because the variety of potential component services sequences available to a user/subscriber, has no bound.

The repertoire (i.e., the list) of compound wireless mobile communication services is stored within a user/subscriber's wireless terminal and/or by the wireless service provider. However, the executions of the component services take place in many locations. Three, but not the only, examples are the wireless terminal, by wireless service provider equipment, and by third party application service providers equipment.

Figure 1:
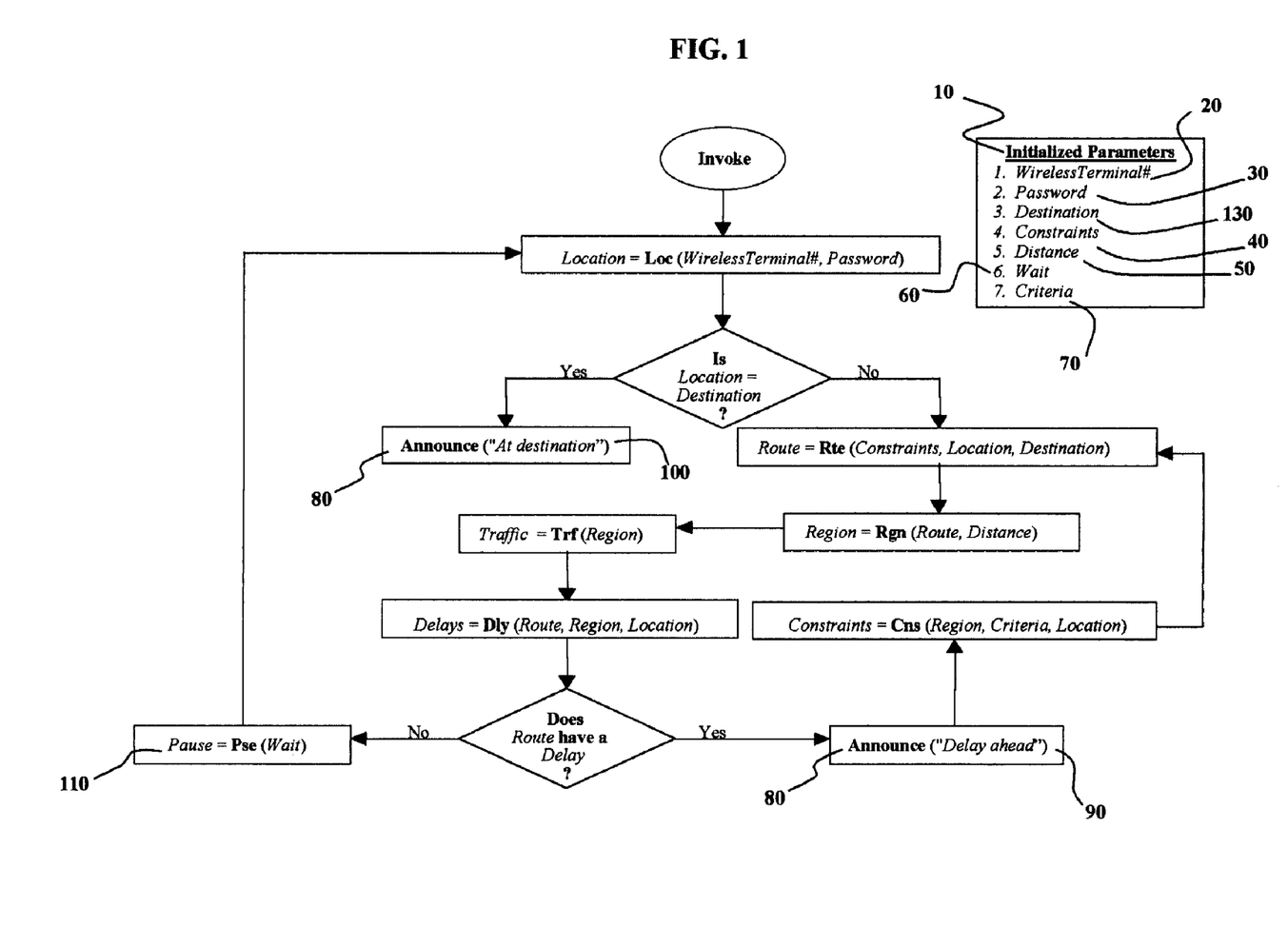
FIG. 1 is a flow chart of the vehicular route assistance compound wireless mobile communication service example described previously.

FIG. 1 provides a flow chart representation of the compound wireless mobile communication service to achieve vehicular route assistance. All potential parameter initializations 10 are identified, based on a value need for a compound wireless mobile communication service execution. Default assignments is a means to avoid burdensome initializations. That is, parameters are always assigned default values prior to compound wireless mobile communication service invocation. The operation of initialization merely overwrites default values for a specified subset of the parameters at invocation. For FIG. 1, WirelessTerminal# 20, Password 30, Constraints 40, Distance 50, Wait 60, and Criteria 70 can all use default values and thereby avoid initialization. Observe that the facility service Announce 80 operates on the understood constant parameters "Delay ahead" 90 and "At destination" 100. Hence, these understood value constant parameters need no initialization.

The Pause 110 facility service, in FIG. 1, is used to reduce the frequency of component service invocations to no more than is necessary for satisfactory performance of the compound wireless mobile communication service. This will lower the cost of using the compound wireless mobile communication service. Employing "instant (short) message service" for communication of data is another means to lower the cost of using the compound wireless mobile communication service execution.

As mentioned earlier, compound wireless mobile communication services may also be identified by functional expressions. If all the parameters cited in the previous paragraph would use their default values, a functional expression for the vehicular route assistance, but not its only one, is:

Vehicular route assistance service—Determines the fastest route to drive between a present location and a destination.
Trip=Trp (Destination)
Where: Destination is the geographical end of a route, Recursion applies to compound wireless mobile communication services; i.e., a compound wireless mobile communication service may contain compound wireless mobile communication services. To achieve this, one builds a compound wireless mobile communication service and then specifies its functional expression in another compound wireless mobile communication service. The vehicular route assistance service (Trp) 120 above is used in FIG. 2 as one possible recursion example of FIG. 1. In this latter example, two destinations exist. The first destination is a stopover for which a time duration can be estimated; e.g., overnight.

Observe that the above function call argument Destination 130 is an initialized constant of the compound wireless mobile communication service shown in FIG. 1. However, Destination 130 now represents a variable in the compound wireless mobile communication service example shown in FIG. 2. This variable will first assume the value assigned to Address1 140. Then, after a stopover of some duration, the Destination 130 will assume the value assigned to Address2 150.

Figure 2:
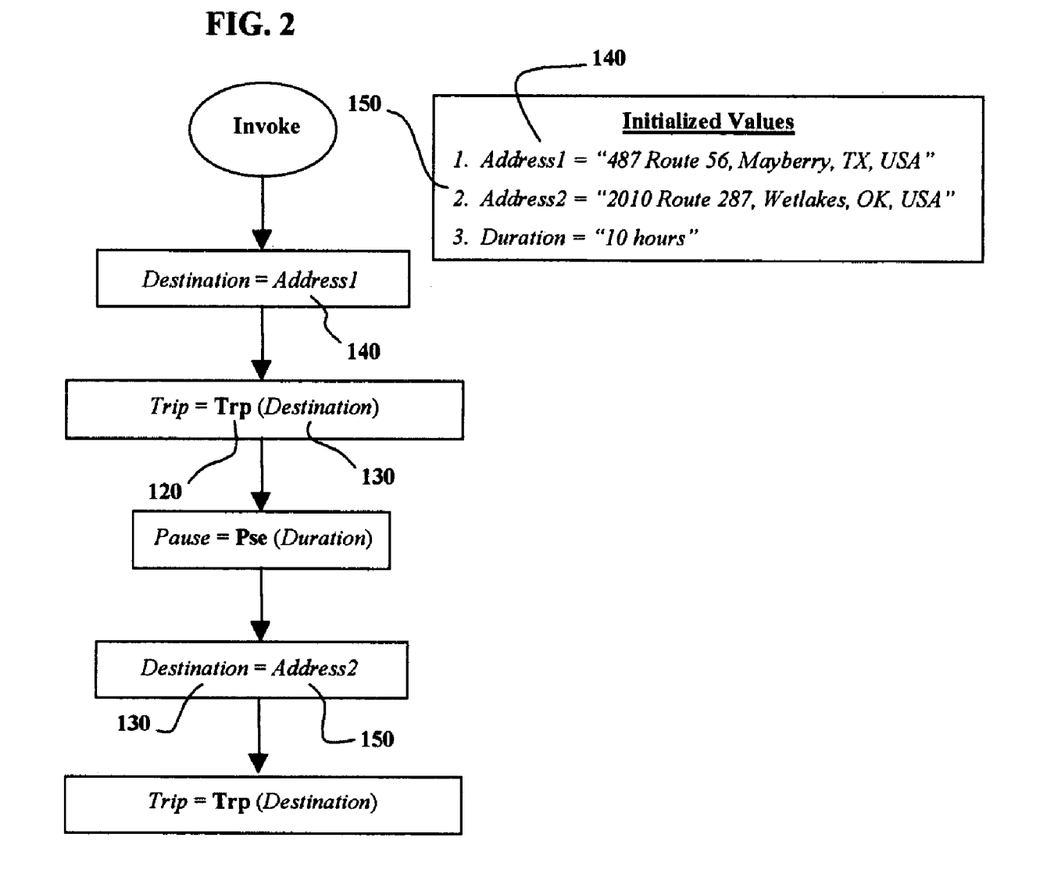
FIG. 2 is a flow chart example, but not its limitation, of the recursive aspect of compound wireless mobile communication services.

The stopover duration need not be precise; only sufficiently long to begin executing Trp 120 before beginning the next route. The pause is used merely to avoid needless mobile communication service invocations during the stopover.

Either a wireless terminal or a computer is used to build compound wireless mobile communication services. Because of its greater computational power, the building facilities are much more extensive with a computer. Consequently, a wireless terminal is used to build less complex compound wireless mobile communication services or to modify those built on a computer.

Figure 3:
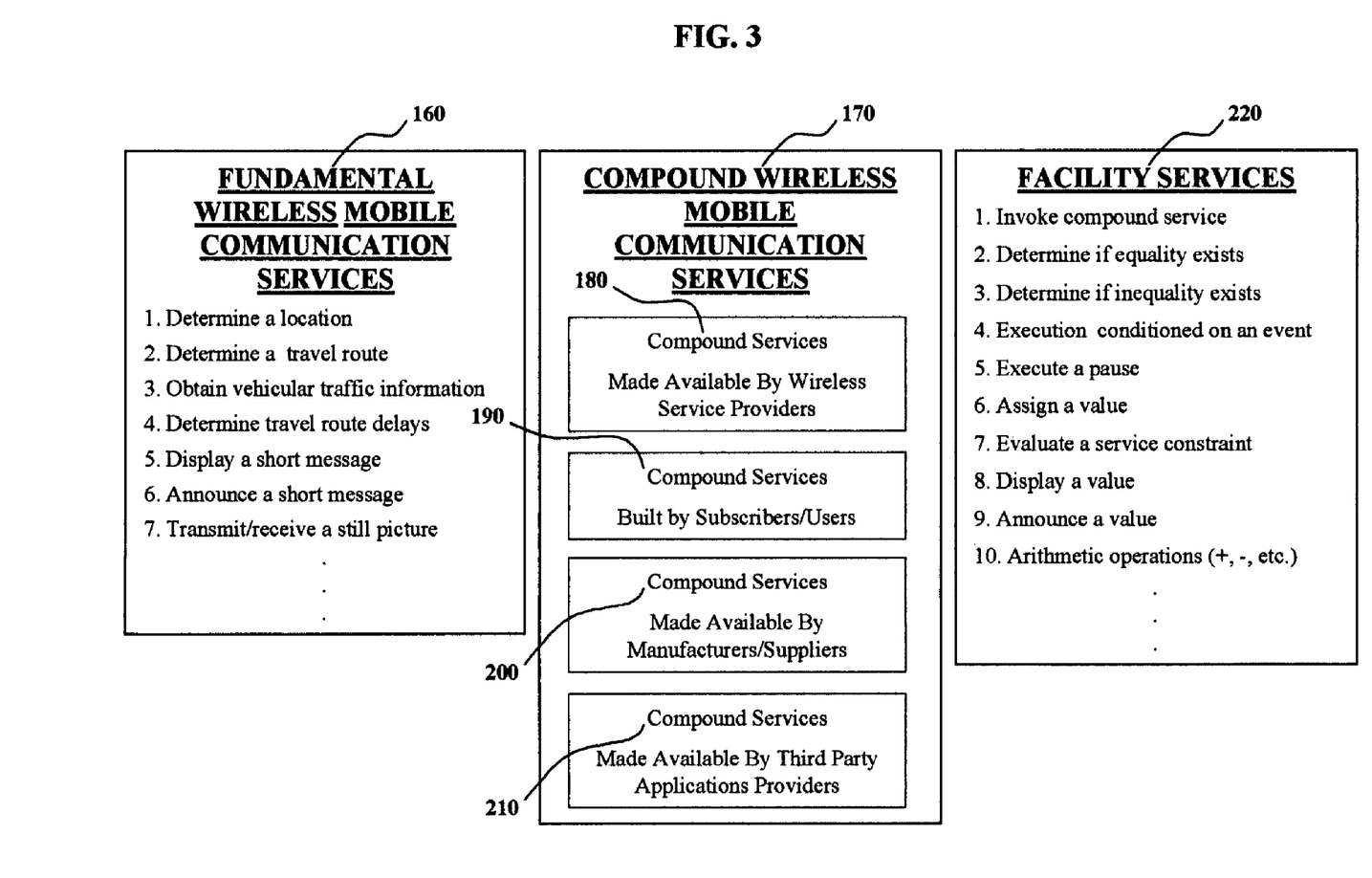
FIG. 3 identifies categories of wireless services that may be embodied within a compound wireless mobile communication service. Included is the recursive aspect of having compound wireless mobile communication services embodied within a more complex compound wireless mobile communication service.

Combinations of textual and graphical icons, partitioned into several menus, are available to click-on and drag selections onto a build area to form a flow chart. A set of the icons represents component services that are identified in FIG. 3. FIG. 3 shows only a sampling of fundamental wireless mobile communication services 160. A wireless mobile communication service provider provides its entire list. Because compound wireless mobile communication services 170 evolve as they are built, only their categories 180 190 200 210 are shown in FIG. 3. Only a sampling of facility services 220 are shown. Additional facility services are indicated in the claims section below.

Figure 4:
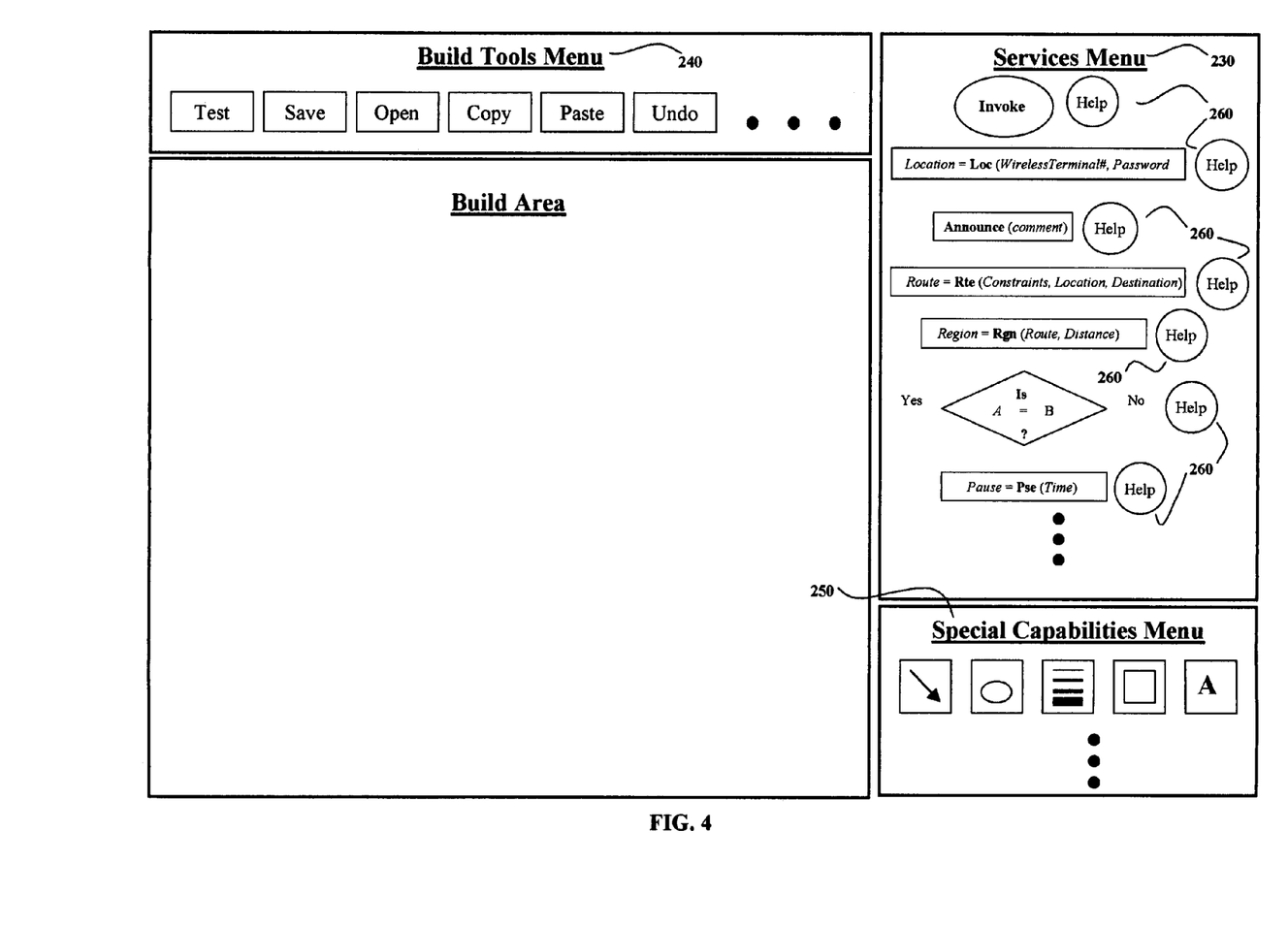
FIG. 4 is a demonstrative facsimile of a compound wireless mobile communication service build layout.

As shown in FIG. 4, the component service icons appear in a services menu 230 portion of the compound wireless mobile communication services build layout. Two other menus exist. The "build tools menu" 240 contains operations that assist in building compound wireless mobile communication services. Example tools are shown in, but not limited to, FIG. 4. Additional tools are identified in the claims section below. There also exists a menu of "special capabilities" 250 to facilitate compound wireless service creation. Example special capabilities are shown in, but not limited to, FIG. 4. Again, additional special capabilities are identified in the claims section below.

Each service icon/text has a "help" button 260 to acquire clarification and usage suggestions via a "pop-up" instruction window possibly having more menus, if more menus are needed. Whenever a selection has been dragged to a flow chart, a pop-up window appears with parameter default values and an override opportunity is provided (initialization of parameters). Permitted override choices are described in this window. If a service requires a choice from a repertoire of constants, a window shows this repertoire to allow dragging a selection to the flow chart. The opportunity to assign constants, not in a repertoire, also exists. One such constant is the vocalization of an announcement. The builder speaks the announcement into a microphone and the spoken words are digitally stored as a constant named within quotes for future use.

Figure 5:
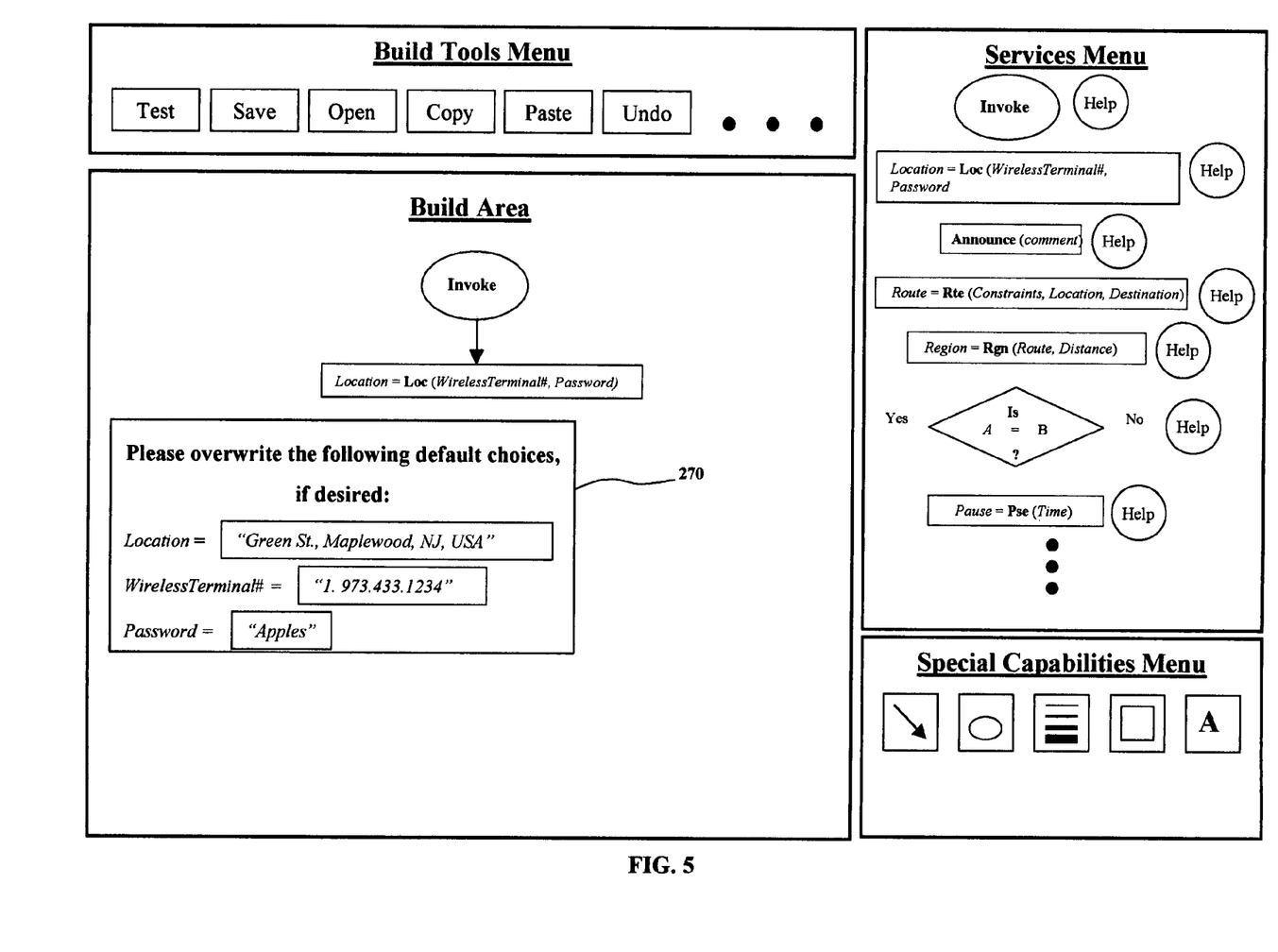
FIG. 5 shows the first partial completion of building another compound wireless mobile communication service example (school bus).
Figure 6:
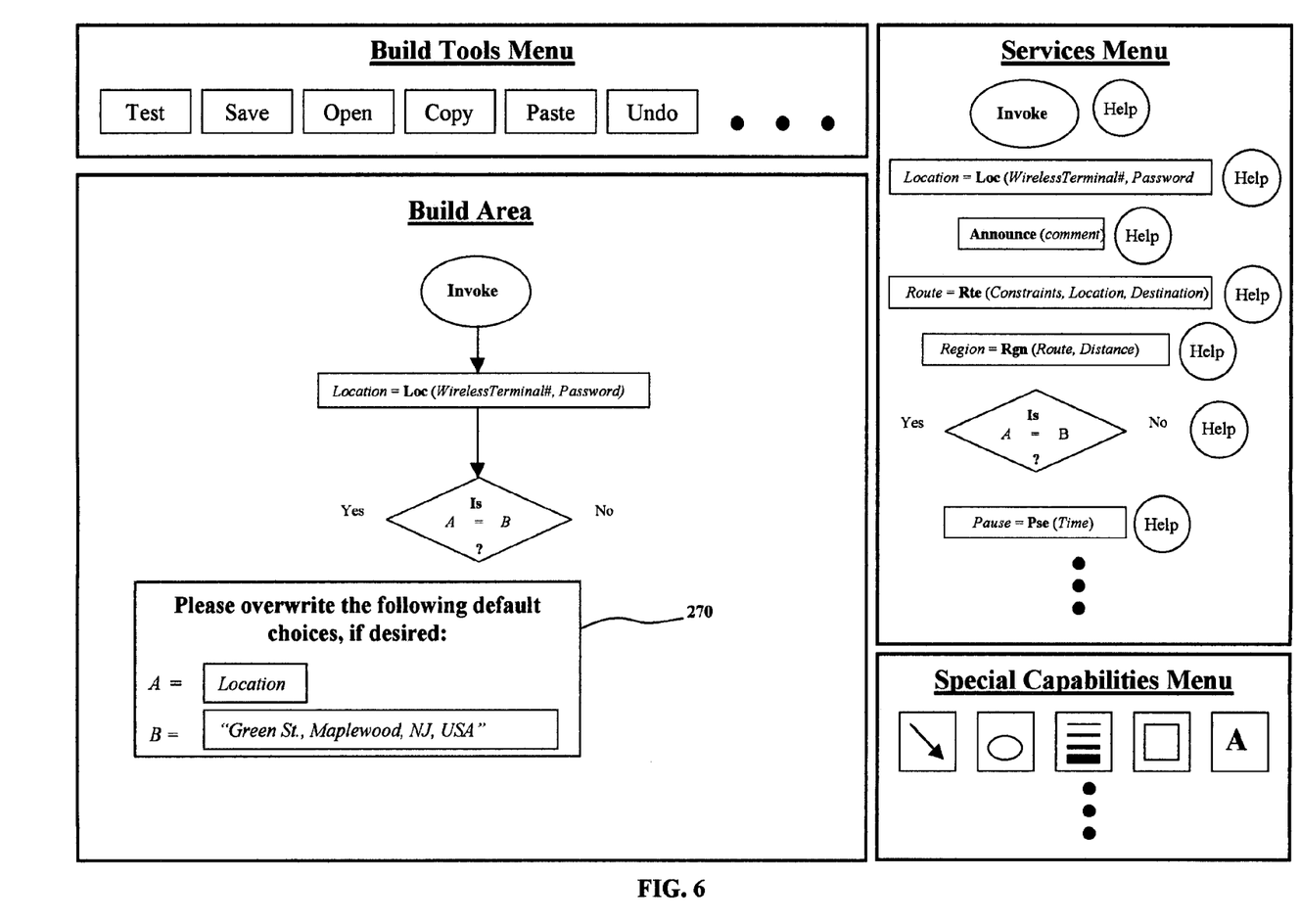
FIG. 6 shows the second partial completion of building the school bus compound wireless mobile communication service example.
Figure 7:
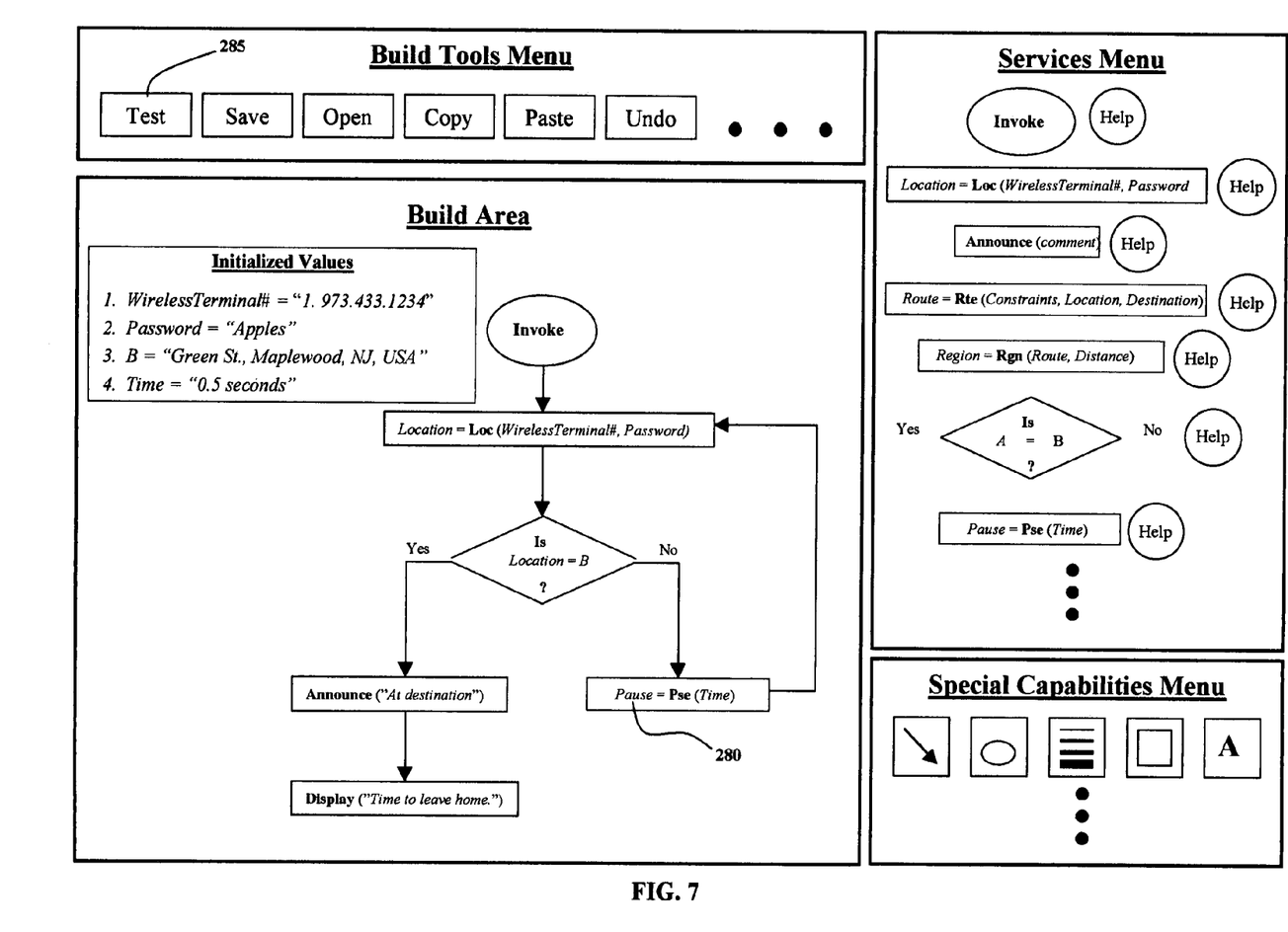
FIG. 7 shows the completed school bus compound wireless mobile communication service example.

An example is now presented to illustrate, but not limit, building a compound wireless mobile communication service with the above facilities. School buses have a propensity to be delayed when weather is inclement. Consequently, school children wait longer than usual when conditions for waiting are especially bad. Assume that the school bus has a wireless terminal and permission to establish the bus' location is granted, via a password, to parents of the school children. The compound wireless mobile communication service is to periodically determine the location of the school bus. When the bus reaches a region such that a child has just enough time to walk from home to the bus stop, the child's parents wireless terminal will make this announcement. FIGS. 5 and 6 illustrate partial completions of the school bus compound wireless mobile communication service and initialization pop-up windows 270. FIG. 7 contains the completed school bus compound wireless mobile communication service. The pause 280 of 0.5 seconds represents the interval for which instant messages are sent of the bus' location.

After completing the build the compound wireless mobile communication service is compiled and then a test 285 simulation is employed to ascertain correctness. When a successful test has been achieved, the compound wireless mobile communication service is downloaded to the wireless terminal for future execution.

The executions of the component services take place in at least three locations: the wireless terminal, by service provider equipment, and by third party application service providers. From the standpoint of subscriber economy, as much of a compound mobile communication wireless service execution as possible should be by the wireless terminal. One of many examples of a compound wireless mobile communication service follows with nearly all component services executed by the wireless terminal.

Consider having a periodic business meeting in a distant location. Also, this meeting has a history of often running beyond its scheduled conclusion time. Because the extended time is a variable and the meeting may end when scheduled, the preference is to reserve a flight commensurate with the scheduled conclusion. As a precaution, a compound wireless mobile communication service is built to assist in managing a departure should there be an extended meeting.

Figure 8:
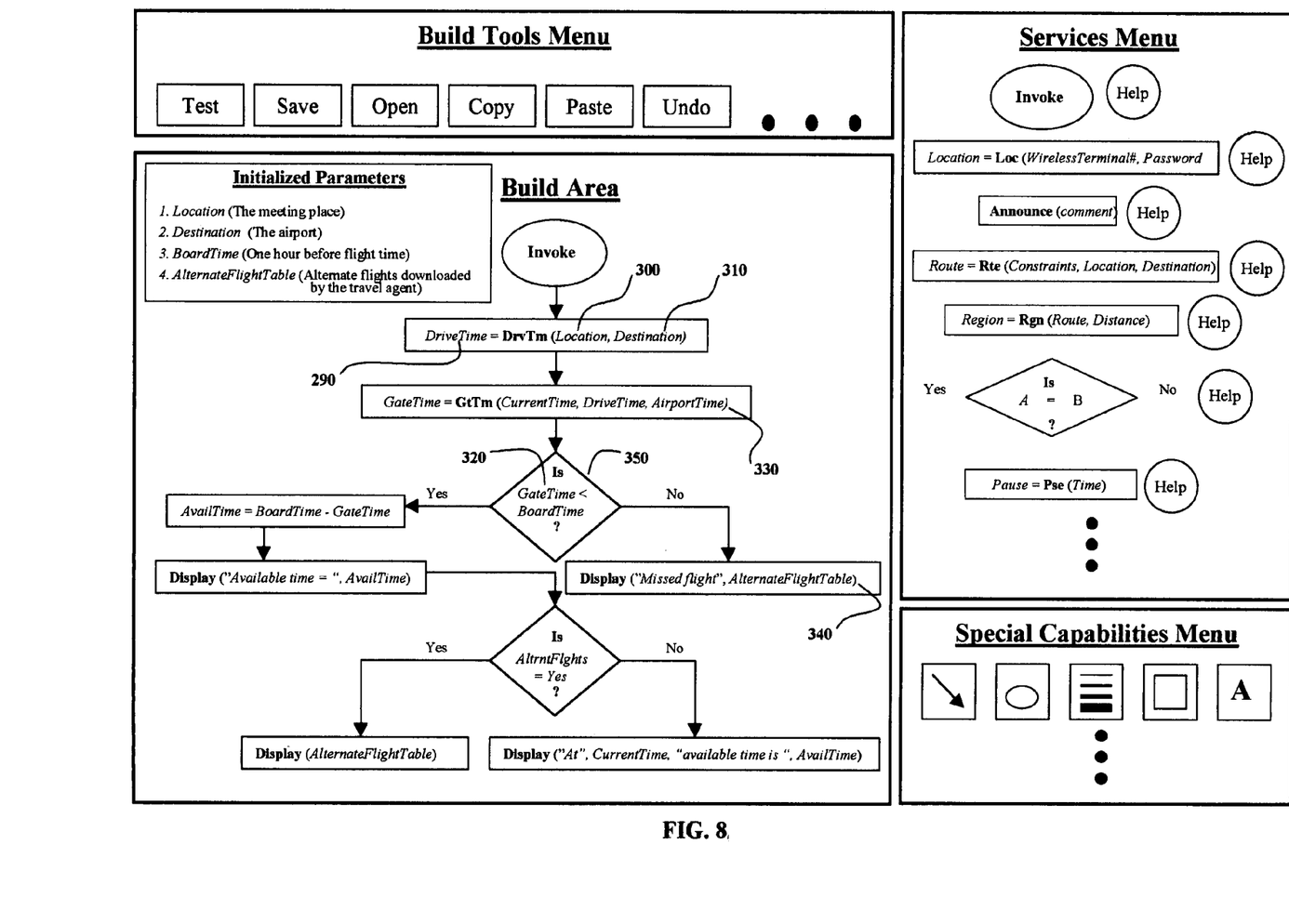
FIG. 8 shows another compound wireless mobile communication service example (business meeting departure).

FIG. 8 shows the compound wireless mobile communication service to assist in managing a departure, should there be an extended meeting. The component services are either themselves compound wireless mobile communication services or facility services. The compound wireless mobile communication service for DriveTime 290 computes the estimated driving time between the place of the meeting and the destination airport. This compound wireless mobile communication service is comparable to the one shown in FIG. 1 for "vehicular route assistance". As before, the fastest route, considering traffic delays, is determined. Besides that of now yielding the DriveTime 290, other significant differences include no iterations (i.e.; DriveTime 290 is computed only once for each invocation), Location 300 and Destination 310 are initialized constants, etc. The acquisition of traffic information would be obtained from the wireless service provider or a third party applications service provider. Otherwise, the remaining component wireless services to determine DriveTime 290 can be executed within the cellular terminal.

The compound wireless mobile communication service for GateTime 320 is an arithmetic computation that utilizes the time clock of the wireless terminal, the computed DriveTime 290, and an initialized constant to estimate the AirportTime 330 for security, check-in, etc. If the computed time of arrival at the gate is beyond the scheduled boarding time, the wireless terminal warns that the flight will be missed and a table of alternate flights is also displayed. These three latter component services do not require wireless communication. The AlternateFlightTable 340 is considered here as a constant, downloaded with the assistance of a travel agent when travel reservations were made. It is also possible to acquire this table dynamically by creating a component compound wireless mobile communication service that communicates with the travel agency when needed during the compound wireless mobile communication service's execution.

If it is estimated that arrival at the gate will precede the scheduled boarding time (GateTime<BoardingTime) 350, the time difference is displayed for a short period. Afterwards, depending upon an initialized constant, AlternateFlightTable 340 is displayed or a reminder of when this compound wireless mobile communication service was executed and the amount of available time that existed at the execution. Again, no wireless communication is required for these five latter component services.

I claim:

1. A process of combining services to build a wireless mobile communication service utilizing a graphical user interface or GUI to form a graphical representation of the wireless mobile communication in a flow chart style, wherein a built wireless mobile communication service, termed herein compound wireless mobile communication service or CWS, consists of component services and a compiled CWS is enacted as a sequence of the combined services by a mobile station or MS and executed by a mechanism used to communicate to a MS, and such a built CWS can also be used as a component service to build another CWS thereby incorporating the property of recursion into the graphical building process, whereby the following building steps comprise a unique and a novel software process to build a CWS:
   a) A builder selects a component service from a menu and drags an image or icon of the selected component service to a build area of a computer screen used for building a CWS;
   b) After the builder locates the component service icon in the build area for building a CWS, for those component services having parameters, a compiler displays a window containing the component service's parameter names and default values for these parameters;
   c) The CWS builder is now permitted by the compiler to substitute new parameter names and to change default parameter values to represent initial condition values for the parameters when the compiled CWS begins its execution;
   d) After completion of the preceding step, the compiler's window disappears and a graphical icon representation of the component service remains containing the CWS builder's decided parameter names, along with a window of the CWS builder's decided parameters' initial condition values;
   e) If the CWS is to contain another component service, steps a), b), c), and d) are iterated such that for more than one component service, the builder identifies the sequence of component service executions by selecting an arrowed line icon from a menu and dragging the icon line to interconnect a pair of component services such that the tail of the arrowed line begins at the antecedent component service icon and the arrow head terminates on the succeeding component service icon.

2. The process of claim 1, further comprising a combination of fundamental wireless mobile communication services or FWS wherein the FWS are elementary component services, representing building block services, that are produced by conventional coding via a suitable software language, and these FWS are considered by the process to be single services; meaning that the FWS represent the bases or kernels from which all CWS originate or are comprised.

3. The process of claim 1, wherein the following methods apply:
   a) building a CWS in a flow chart graphical representation using computer facilities and then compiling into appropriate computer code and downloading the computer coded representation of the CWS into a MS;
   b) using computer facilities to select graphical or textual images that represent component services to build a CWS where the component services are represented by named operational or functional expressions that can contain dependent parameters or independent parameters;
   c) using computer facilities to request "help" to explain and clarify the application and use of a selected graphical or textual image.

4. The process of claim 3 wherein further improvements comprise a MS that contains the GUI and the compiler to build a CWS.

5. The processes of claim 2, wherein a menu of facility services icons are used for providing one or more of the following operations as component services in compound wireless mobile communication services:
   a) computing arithmetic functions;
   b) assigning values to parameters;
   c) conditioning the execution of said component service on an event determination;
   d) determining if parameters are equal;
   e) determining if parameters are unequal;

f) pausing the execution of a CWS;
g) branching on a condition;
h) displaying a parameter value;
i) announcing or playing an audible parameter value;
j) invoking a CWS;
k) evaluating a service constraint.

6. The process of claim 5 further comprising a menu of special capabilities that achieve the following;
   a) drawing lines with arrowheads that manifests the execution sequence of component services;
   b) entering alphanumeric characters into a geometric element when building a CWS;
   c) drawing geometric elements as rectangles and ellipses when building a CWS.

7. The process of claim 6 further comprising a menu for:
   a) testing a built CWS for proper performance;
   b) assigning an operational or functional expression to a CWS;
   c) recording and storing a voice message as a value to be used in the facility service that audibly announces comments;
   d) adding a CWS operational or functional expression to the repertoire of component services for use to build other CWS;
   e) saving a built CWS in specified memory location;
   f) copying a selected group of component services into a temporary memory;
   g) undoing changes made while building a CWS;
   h) opening a CWS display of interconnected said component services;
   i) opening any menu used to build a CWS;
   j) selecting line widths of geometric shapes in a displayed CWS.

* * * * *